(12) United States Patent
Choi et al.

(10) Patent No.: US 12,221,919 B1
(45) Date of Patent: Feb. 11, 2025

(54) CONTROL OF A COLD LIGHT OFF CATALYST TO MINIMIZE TAILPIPE EMISSIONS

(71) Applicant: FCA US LLC, Auburn Hills, MI (US)

(72) Inventors: Jeongyong Choi, Rochester, MI (US);
Michael Barkey, Maidstone (CA);
William Attard, Brighton, MI (US);
Filip Vucak, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/526,012

(22) Filed: Dec. 1, 2023

(51) Int. Cl.
*F02B 37/18* (2006.01)
*F01N 3/28* (2006.01)

(52) U.S. Cl.
CPC .......... *F02B 37/183* (2013.01); *F01N 3/2892* (2013.01)

(58) Field of Classification Search
CPC ...... F02B 37/183; F02B 37/18; F01N 3/2892; F01N 13/009; F01N 3/2053; F01N 2340/06; F01N 2410/06; F01N 2900/1602; F01N 3/20; F01N 3/2006; F02D 41/06
See application file for complete search history.

(56) References Cited

U.S. PATENT DOCUMENTS

| | | | | |
|---|---|---|---|---|
| 4,404,804 A | * | 9/1983 | Tadokoro | F01N 3/22 60/284 |
| 6,519,931 B2 | * | 2/2003 | Fujieda | F02D 41/0235 60/287 |
| 10,704,461 B2 | * | 7/2020 | Gerard | F02B 37/013 |
| 11,111,844 B2 | * | 9/2021 | Buerkle | F02B 39/10 |
| 11,885,258 B2 | * | 1/2024 | Mosciaro | F02B 37/183 |
| 2011/0179770 A1 | * | 7/2011 | Schmuck-Soldan | F02B 37/18 60/299 |
| 2014/0227109 A1 | * | 8/2014 | Wang | F02D 41/0007 417/53 |
| 2020/0271046 A1 | * | 8/2020 | Kelly | F02B 37/10 |
| 2022/0349329 A1 | * | 11/2022 | Fischer | F01N 13/011 |

\* cited by examiner

*Primary Examiner* — Jesse S Bogue
(74) *Attorney, Agent, or Firm* — Jeremy J. Klobucar

(57) ABSTRACT

A control system for an engine comprising a turbocharger includes a cold light off catalyst (CLOC), a main catalyst, a CLOC valve, and a controller. The CLOC is positioned in a bypass passage around a turbine of the turbocharger. The main catalyst is disposed downstream of the turbine and the CLOC. The CLOC valve selectively routes exhaust flow from the engine between the turbine and the CLOC. The controller determines whether a temperature of the main catalyst is less than a threshold; commands a CLOC mode wherein the CLOC valve routes at least some exhaust to the CLOC based on the temperature being less than the threshold; determines whether a boost is requested at the engine; determines whether a full turbine input is needed to satisfy the requested boost; and disables the CLOC mode based on a determination that a full turbine input is needed.

10 Claims, 3 Drawing Sheets

CONTROL OF A COLD LIGHT OFF CATALYST TO MINIMIZE TAILPIPE EMISSIONS

FIELD

The present application generally relates to emissions control and, more particularly, to techniques for controlling operation of a cold light off catalyst.

BACKGROUND

As is known, pollutant emissions such as nitrogen oxides (NOx), carbon monoxide (CO), and hydrocarbon (HC) are temperature sensitive in aftertreatment systems. Such emission conversion begins at high temperatures such as over 350C depending on catalyst formulation. Typically, at engine startup, idle exhaust temperatures are much below the high temperatures needed for optimal catalyst efficiencies. In particular, an amount of time is needed for the exhaust to heat up from the typical exhaust temperatures to the elevated temperatures that satisfy a desired efficiency target. Operation of the engine during this heating up time is inefficient for conversion of such pollutants. Accordingly, a need exists in the art to improve upon efficiencies of aftertreatment systems.

SUMMARY

According to one example aspect of the invention, a control system for an engine comprising a turbocharger includes a separate cold light off catalyst (CLOC), a main catalyst, a CLOC valve diverter, and a controller. The CLOC is positioned in a bypass passage around a turbine of the turbocharger. The main catalyst is disposed downstream of the turbine and the CLOC. The CLOC valve selectively routes exhaust flow from the engine between the turbine and the CLOC. The controller is configured to determine whether a temperature of the main catalyst is less than a threshold; command a CLOC mode wherein the CLOC valve routes at least some exhaust to the CLOC based on the temperature being less than the threshold; determine whether a boost is requested at the engine; determine whether a full turbine input is needed to satisfy the requested boost; disable the CLOC mode based on a determination that a full turbine input is needed; and command partial CLOC mode wherein the CLOC valve is moved to an intermediate position whereby exhaust is routed to both of the CLOC and the turbine based on the full turbine input not being needed.

In some implementations, commanding partial CLOC mode comprises determining an optimal CLOC valve position that blends exhaust flow to the CLOC and the turbine to optimize emissions; and commanding the CLOC valve to the optimal position.

In some implementations, commanding partial CLOC mode comprises determining an optimal CLOC valve position that blends exhaust flow to the CLOC and the turbine to optimize boost; and commanding the CLOC valve to the optimal position.

In some implementations, commanding partial CLOC mode comprises determining an optimal CLOC valve position that blends exhaust flow to the CLOC and the turbine to optimize both emissions and boost; and commanding the CLOC valve to the optimal position.

In examples, the temperature threshold corresponds to a temperature threshold that promotes satisfactory operation of the main catalyst.

In some implementations, determining whether a boost is requested at the engine comprises receiving an input from an accelerator pedal indicative of an acceleration request of the engine.

According to another aspect of the invention, a method for controlling an engine comprising a turbocharger is provided. The method includes determining whether a temperature of a main catalyst disposed in an engine exhaust is less than a threshold; commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode based on the temperature being less than the threshold. Control determines whether a boost is requested of the engine. A determination is made whether full turbine input is needed to satisfy the requested boost. The CLOC mode is disabled based on a determination that a full turbine input is needed. A partial CLOC mode is commanded wherein the CLOC valve is moved to an intermediate position whereby exhaust is routed to both of the CLOC and the turbine based on the full turbine input not being needed.

In some implementations, commanding partial CLOC mode comprises determining an optimal CLOC valve position that blends exhaust flow to the CLOC and the turbine to optimize emissions; and commanding the CLOC valve to the optimal position.

In some implementations, commanding partial CLOC mode comprises determining an optimal CLOC valve position that blends exhaust flow to the CLOC and the turbine to optimize boost; and commanding the CLOC valve to the optimal position.

In some implementations, commanding partial CLOC mode comprises determining an optimal CLOC valve position that blends exhaust flow to the CLOC and the turbine to optimize both emissions and boost; and commanding the CLOC valve to the optimal position.

In examples, the temperature threshold corresponds to a temperature threshold that promotes satisfactory operation of the main catalyst.

According to another example aspect of the invention, a method for controlling an engine comprising a turbocharger is provided. The method includes commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode based on the temperature being less than the threshold. Control determines whether a temperature of a main catalyst disposed in an engine exhaust is greater than a threshold. Control determines whether the reactions of the main catalyst correspond to poor conversion efficiency potential based on the mid bed oxygen sensor. The CLOC mode is commanded off whereby the CLOC valve routes zero exhaust flow to the CLOC based on a determination that the catalyst is not lean. Fuel enrichment is commanded to the engine based on a determination that the catalyst is running lean.

In additional implementations, the method includes determining whether the reactions of the main catalyst correspond to a stoichiometric catalyst condition; and commanding the CLOC mode off whereby the CLOC valve routes zero exhaust flow to the CLOC based on a determination that the catalyst is at a stoichiometric status.

In other implementations, the method includes determining whether the temperature of a main catalyst disposed in an engine exhaust is greater than a threshold comprises receiving a signal from an oxygen sensor disposed in the main catalyst indicative of an oxygen content.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present disclosure is directed toward emission control on turbocharged engines. As is known, an oxygen or lambda sensor, placed intermediate an engine exhaust manifold and the main catalyst measures an oxygen content. The measurement is used to adjust the fuel amount that is sent to the engine by optimizing the air and fuel mixture. An engine system according to the present disclosure includes a cold light off catalyst (CLOC) where a CLOC valve is controlled to divert exhaust gas from the turbine of the turbocharger and through a small catalyst (upstream of the main catalyst) in a CLOC mode. The CLOC can achieve high efficiency quickly to treat the exhaust gas, while a much larger downstream main catalyst is warming up.

During full rerouting of the exhaust from the turbocharger and to the CLOC, the main catalyst inlet gas will ideally have low concentrations of hydrocarbons (HC), carbon monoxide (CO) and nitrogen oxide (NOx) which will impact the reactions of the main catalyst. Once the CLOC is deactivated, the main catalyst must be at peak conversion efficiency as it will then be responsible for all emission conversion. The techniques herein require the main catalyst oxygen sensor to be reading stoichiometric or slightly rich before control can command the CLOC to be deactivated to avoid NOx breakthrough after the transition from routing the exhaust to the CLOC in CLOC mode to routing the exhaust to the turbine (e.g., when CLOC mode is deactivated).

Additional techniques disclosed herein include regulating the CLOC valve while in CLOC mode based on a boost torque request. In this regard, in the event that control receives a boost torque request from the engine while in CLOC mode, control can move the CLOC valve to a position wherein all, or some exhaust flow is directed back into turbine (instead of through the CLOC) to build boost pressure back into the turbocharger (e.g., at the compressor to enable increased air flow into the engine intake manifold).

Figure 1:
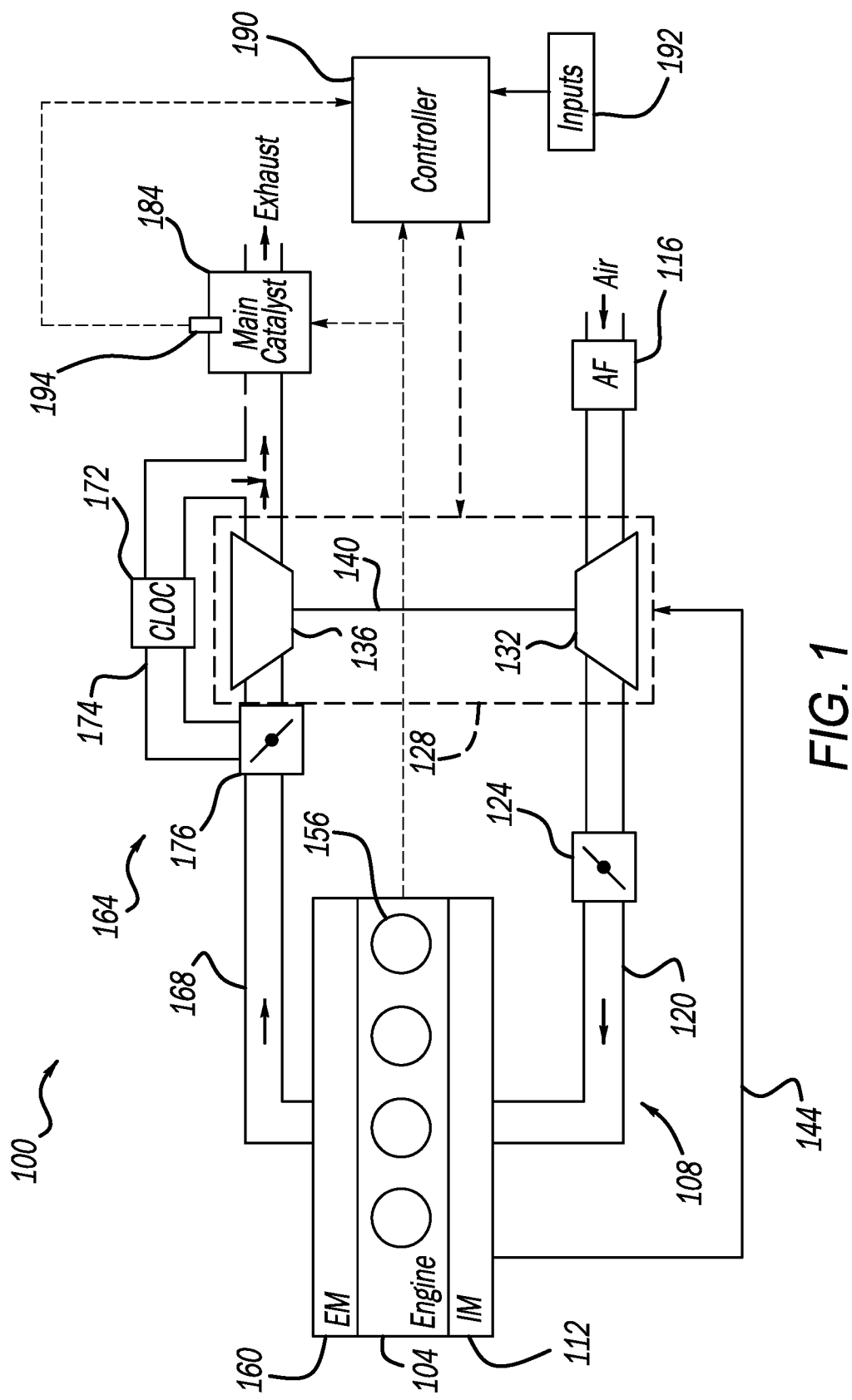
FIG. 1 is a diagram of an example vehicle comprising a turbocharged engine incorporating a cold light off catalyst (CLOC) and CLOC valve according to the principles of the present disclosure.

Referring now to FIG. 1, a diagram of an example vehicle or vehicle control system 100 is illustrated. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a twin-scroll turbine) of the turbocharger 136 via a shaft 140.

The pressurized air is distributed to a plurality of cylinders 156 and combined with fuel (e.g., from respective direct-injection or port-injection fuel injectors) to form an air/fuel mixture. While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104.

The exhaust gas from the exhaust manifold 160 is provided to an exhaust system 164 comprising an exhaust passage 168. Kinetic energy of the exhaust gas drives the turbine 136, which in turn drives the compressor 132 via the shaft 140. A cold light off catalyst (CLOC) 172 is routed in a bypass passage 174 around the turbine 136. A CLOC valve 176 selectively controls exhaust flow into the turbine 136 of the turbocharger 128 and/or into the CLOC 172 via the bypass passage 174. Explained further, the CLOC valve 176 moves between a fully open position whereby all exhaust gas is routed to the turbine 136, a fully closed position whereby all exhaust gas is routed to the CLOC 172, and infinite positions therebetween causing a blend of exhaust to be routed to both of the turbine 136 and the CLOC 172.

As used herein a "CLOC mode" is used to refer to a controller commanding the CLOC valve 176 to rout at least some exhaust to the CLOC 172. A main exhaust gas treatment system 184, such as a catalytic converter, treats exhaust gas to decrease or eliminate emissions before it is released into the atmosphere. All exhaust gas regardless of passing through the turbine 136 or the CLOC 172 is directed to the main exhaust gas treatment system 184. The CLOC 172 includes a small catalyst that can reach high conversion efficiency quickly and treat the exhaust gas such as when the main catalyst 184 has yet to reach optimal operating temperature (such as in examples 400 degrees Celsius).

A controller, also referred to herein as an engine controller, 190 controls operation of the vehicle 100. Examples of components controlled by the controller 190 include the engine 104, the throttle valve 124, and the CLOC valve 176. It will be appreciated that the controller 190 controls specific components of the vehicle 100 that are not illustrated, such as, but not limited to, fuel injectors, spark plugs, an EGR valve, a VVC system (e.g., intake/exhaust valve lift/actuation), a transmission, and the like.

An oxygen sensor 194 is incorporated at the main catalyst 194 and measures an oxygen content. The measurement is used to adjust the fuel amount that is sent to the engine to optimize the air and fuel mixture. As is known, stoichiometric combustion is the ideal process where the optimal amount of oxygen and fuel are consumed to achieve maximum combustion efficiency. In this regard, stoichiometry results in no excess fuel and no excess air.

As will be described in detail herein, the reading of the oxygen sensor 194 is used to determine whether the exhaust is reading stoichiometric or slightly rich (more fuel than air). CLOC mode can be deactivated when the reading of the oxygen sensor 194 is reading stoichiometric or slightly rich to avoid breakthrough emissions.

Lubrication oil from the engine 104 is routed through an oil line 144 to the turbocharger 128 to lubricate components of the turbocharger 128. In examples, the oil is sourced from the engine 104 at the sump.

The controller 190 controls operation of various components based on measured and/or modeled parameters. Inputs 192 such as one or more sensors are configured to measure one or more parameters, and communicate signals indicative thereof to the controller 190 (pressures, temperatures, speeds, etc.) as discussed in greater detail herein. Other parameters could be modeled by the controller 190, e.g., based on other measured parameters. The controller 190 is also configured to perform the engine/turbocharger control techniques.

Figure 2:
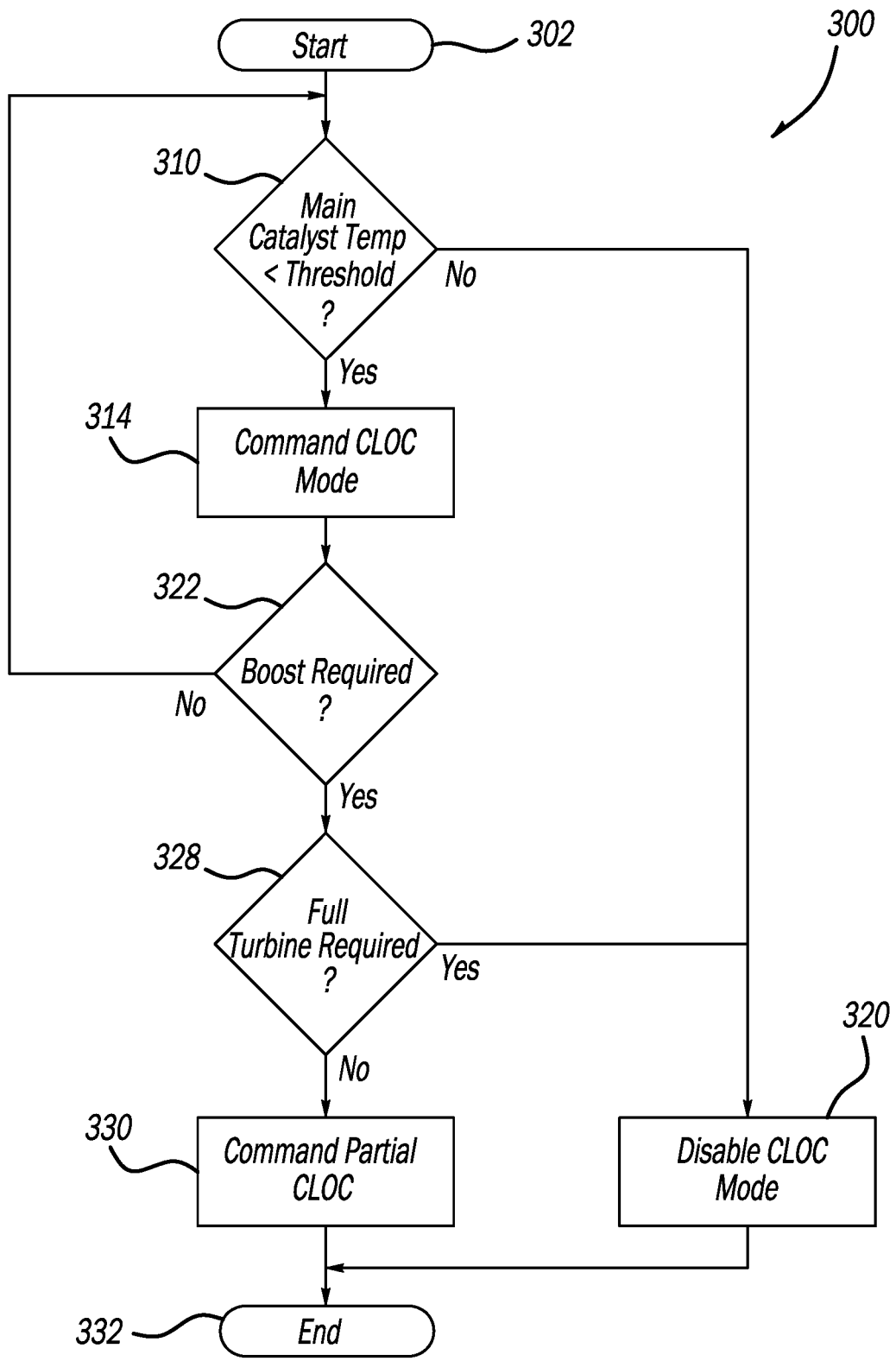
FIG. 2 is a flow diagram of a first exemplary method of controlling an engine system that includes a cold light off catalyst to minimize tailpipe emissions according to the principles of the present disclosure.

Referring now to FIG. 2, a flow chart of an example method 300 of operating the engine 104 having the turbocharger 128, CLOC 172, and CLOC valve 176 is illustrated. For explanatory purposes, components of the vehicle 100 will be referenced, but it will be appreciated that this method 300 could be used for any engine having a turbocharger and CLOC. Control starts at 302. At 310, the controller 190 determines whether the temperature of the main catalyst 194 is less than a threshold. The temperature of the main catalyst 194 can be determined such as by the inputs 192 including a temperature sensor positioned at the main catalyst 194. In examples the threshold temperature can be 400 degrees Celsius. It is appreciated that the temperature is merely exemplary and can be different depending upon the makeup of the components in the main catalyst 194. If the temperature of the main catalyst 194 is not less than a threshold, control disables CLOC mode at 320. Again, if the temperature of the main catalyst 194 is not less than a threshold, the main catalyst 194 is at temperature and can perform the emission reduction without the CLOC. If the temperature of the main catalyst 194 is less than a threshold, control commands the CLOC 172 and CLOC valve 176 to enter CLOC mode at 314.

At 322 control determines whether a boost is required. A boost can be required such as by an accelerator pedal input provided at the inputs 192. If a boost is not required, control loops to 310. If a boost is required, control determines whether a full turbine input is required to meet the acceleration demand at 328. If yes, control disables CLOC mode at 320. If control determines that a full boost is not required to meet the acceleration demand, control commands a partial CLOC mode at 330. A partial CLOC mode can correspond to the CLOC valve 176 moving to a position intermediate fully open and closed whereby exhaust flow is blended between the CLOC 172 (to satisfy emissions) and the turbine 136 (to satisfy boost request). The exact position of the partial CLOC mode can be determined by the controller 190 to minimize pollutant emissions versus boost request. Control ends at 332.

Figure 3:
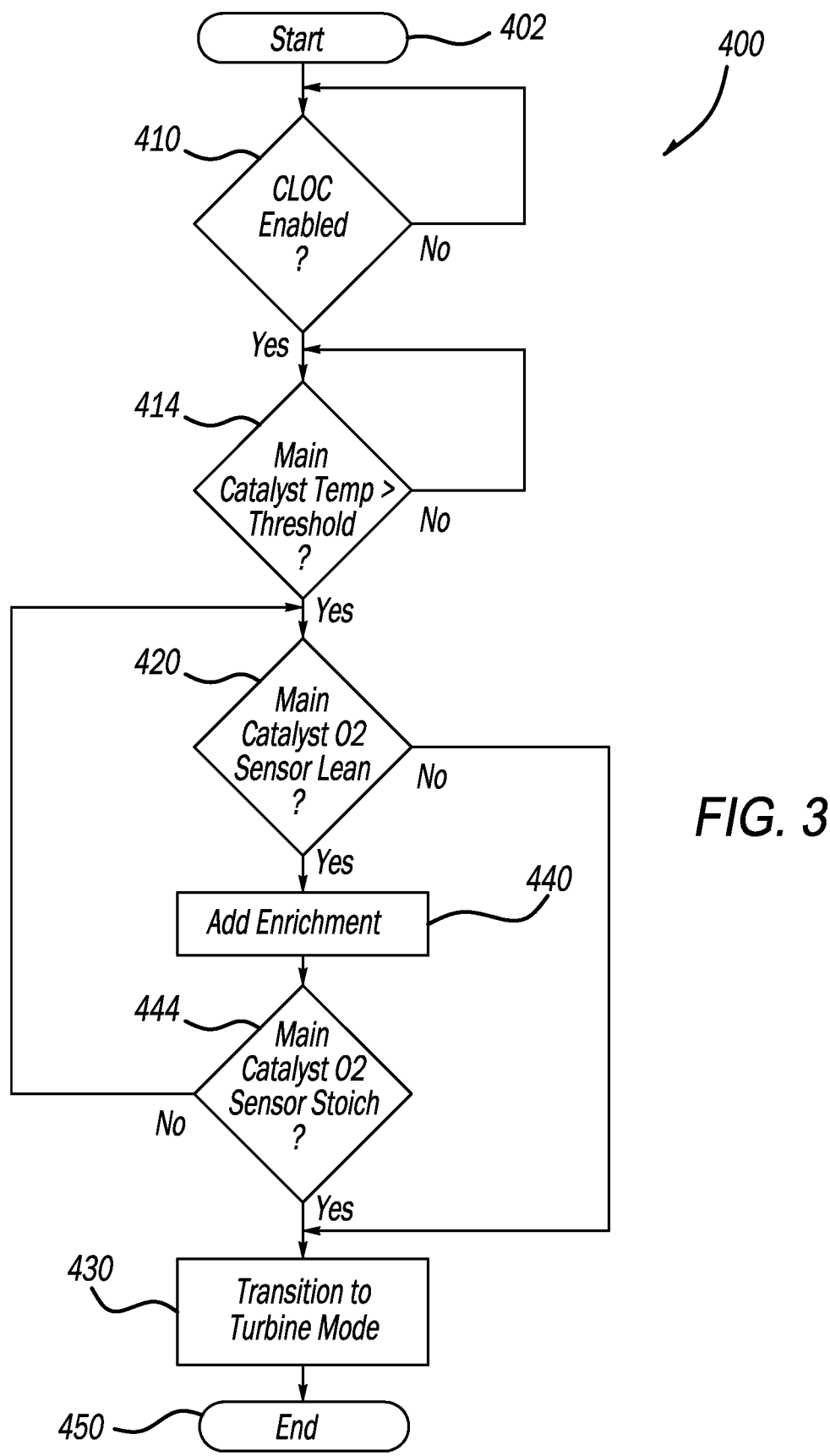
FIG. 3 is a flow diagram of a second exemplary method of controlling an engine system that includes a cold light off catalyst to minimize tailpipe emissions according to the principles of the present disclosure

Referring now to FIG. 3, a flow chart of an example method 400 of operating the engine 104 having the turbocharger 128, CLOC 172, the CLOC valve 176 and oxygen sensor 194 is illustrated. For explanatory purposes, components of the vehicle 100 will be referenced, but it will be appreciated that this method 300 could be used for any engine having a turbocharger and CLOC. Control starts at 402. At 410, the controller 190 determines whether CLOC is enabled. Again, CLOC operation can be enabled such as at startup of the engine 104 when the main catalyst 184 has not reached optimal operating temperature. If CLOC is not enabled control loops to 410. If CLOC is enabled, control determines whether a temperature of the main catalyst 184 is greater than a threshold at 414. In examples the threshold temperature can be 400 degrees Celsius. It is appreciated that the temperature is merely exemplary and can be different depending upon the makeup of the components in the main catalyst 194. If not, control loops to 414.

At 420 control determines whether the signal from the oxygen sensor 194 corresponds to a lean condition (more air than fuel). In examples, control determines whether reactions of the main catalyst correspond to poor conversion efficiency potential based on the oxygen sensor 194. If not, control loops to 430 where the system transitions to turbine mode (CLOC disabled). If the signal from the oxygen sensor 194 corresponds to a lean condition, control adds enrichment at 440. In examples, adding enrichment can include commanding an increased amount of fuel to the engine 104. At 444 control determines whether the signal from the oxygen sensor 194 corresponds to a stoichiometric condition. If not, control loops to 414. If yes, control proceeds to 430 where the system transitions to turbine mode (CLOC disabled). Control ends at 450.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine comprising a turbocharger, the system comprising:
   a cold light off catalyst (CLOC) positioned in a bypass passage around a turbine of the turbocharger;
   a main catalyst disposed downstream of the turbine and CLOC;
   a CLOC valve that selectively routes exhaust flow from the engine between the turbine and the CLOC;
   a controller configured to:
      determine whether a temperature of the main catalyst is less than a threshold;
      command a CLOC mode wherein the CLOC valve routes at least some exhaust to the CLOC based on the temperature being less than the threshold;
      receive an input from an accelerator pedal indicative of an acceleration request of the engine;
      determine, based on the input from the accelerator pedal, whether a boost is requested at the engine;

determine whether a full turbine input is needed to satisfy the requested boost;

disable the CLOC mode based on a determination that a full turbine input is needed; and command partial CLOC mode wherein the CLOC valve is moved to an intermediate position whereby exhaust is routed to both of the CLOC and the turbine based on the full turbine input not being needed.

2. The control system of claim 1, wherein commanding partial CLOC mode comprises:

determining an optimal CLOC valve position that blends exhaust flow to the CLOC and the turbine to optimize emissions; and commanding the CLOC valve to the optimal position.

3. The control system of claim 1, wherein commanding partial CLOC mode comprises:

determining an optimal CLOC valve position that blends exhaust flow to the CLOC and the turbine to optimize boost; and commanding the CLOC valve to the optimal position.

4. The control system of claim 1, wherein commanding partial CLOC mode comprises:

determining an optimal CLOC valve position that blends exhaust flow to the CLOC and the turbine to optimize both emissions and boost; and commanding the CLOC valve to the optimal position.

5. The control system of claim 1, wherein the temperature threshold corresponds to a temperature threshold that promotes satisfactory operation of the main catalyst.

6. A method for controlling an engine comprising a turbocharger, the method comprising:

determining whether a temperature of a main catalyst disposed in an engine exhaust is greater than a threshold;

commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode based on the temperature being less than the threshold;

receiving an input from an accelerator pedal indicative of an acceleration request of the engine;

determining, based on the input received from the accelerator pedal, whether a boost is requested at the engine;

determining whether a full turbine input is needed to satisfy the requested boost; and disabling the CLOC mode based on a determination that a full turbine input is needed; and commanding partial CLOC mode wherein the CLOC valve is moved to an intermediate position whereby exhaust is routed to both of the CLOC and the turbine based on the full turbine input not being needed.

7. The method of claim 6, wherein commanding partial CLOC mode comprises:

determining an optimal CLOC valve position that blends exhaust flow to the CLOC and the turbine to optimize emissions; and commanding the CLOC valve to the optimal position.

8. The method of claim 6, wherein commanding partial CLOC mode comprises:

determining an optimal CLOC valve position that blends exhaust flow to the CLOC and the turbine to optimize boost; and commanding the CLOC valve to the optimal position.

9. The method of claim 6, wherein commanding partial CLOC mode comprises:

determining an optimal CLOC valve position that blends exhaust flow to the CLOC and the turbine to optimize both emissions and boost; and commanding the CLOC valve to the optimal position.

10. The method of claim 6, wherein the temperature threshold corresponds to a temperature threshold that promotes satisfactory operation of the main catalyst.

* * * * *